(12) United States Patent
Taniguchi et al.

(10) Patent No.: US 7,948,581 B2
(45) Date of Patent: May 24, 2011

(54) LIQUID CRYSTAL DISPLAY

(75) Inventors: Hitoshi Taniguchi, Yokohama (JP); Akitoyo Konno, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 124 days.

(21) Appl. No.: 12/256,493

(22) Filed: Oct. 23, 2008

(65) Prior Publication Data
US 2009/0109373 A1  Apr. 30, 2009

(30) Foreign Application Priority Data

Oct. 24, 2007  (JP) ................................. 2007-275902

(51) Int. Cl.
G02F 1/13357  (2006.01)
(52) U.S. Cl. .............. 349/65; 362/26; 362/600; 362/627
(58) Field of Classification Search .................. None
See application file for complete search history.

(56) References Cited

U.S. PATENT DOCUMENTS 6,727,963 B1 * 4/2004 Taniguchi et al. .............. 349/65

FOREIGN PATENT DOCUMENTS

| JP | 04-162002 | 6/1992 |
| JP | 2000-131690 | 5/2000 |
| JP | 2000-314876 | 11/2000 |
| JP | 2002-014341 | 1/2002 |
| JP | 2002-098839 | 4/2002 |
| JP | 2002-116441 | 4/2002 |
| JP | 2003-140150 | 5/2003 |
| JP | 2005-321693 | 11/2005 |

* cited by examiner

*Primary Examiner* — Sarah Hahm
(74) *Attorney, Agent, or Firm* — Antonelli, Terry, Stout & Kraus, LLP.

(57) ABSTRACT

In a liquid crystal display equipped with a side edge backlight device, visualization of "a dot provided to a light guide plate" in the vicinity of the light source while keeping the luminance of the display screen. The shapes and the arrangement of the light diffusing dots (dots) provided to the principal surface of the light guide plate of the backlight device are made different between the area of the principal surface in the vicinity of the light source and the other areas, thereby adjusting the whiteness of the light guide plate in the vicinity of the light source. The plurality of dots formed in the vicinity of the light source are each composed of a first section for diffusing the light propagating the light guide plate, and a second section surrounded by the first section and less capable of diffusing the light, and are disposed in the vicinity of the light source in a zigzag manner.

4 Claims, 8 Drawing Sheets

LIQUID CRYSTAL DISPLAY

CLAIM OF PRIORITY

The present application claims priority from Japanese application serial no. JP2007-275902, filed on Oct. 24, 2007, the content of which is hereby incorporated by reference into this application.

BACKGROUND OF THE INVENTION

1. Technical Field

The present invention relates to a member used for a liquid crystal display, such as a backlight device (a backlight), and to a liquid crystal display using the member.

2. Related Art

In recent years, low-profiling, cost reduction, and power reduction of liquid crystal television sets (hereinafter referred to as liquid crystal TVs) with a large screen have been promoted, and widespread thereof is now in progress. In order for further low-profiling such large-screen liquid crystal TVs, super low-profiling of the backlight devices needs to be achieved. As a conventional backlight device for such large-screen liquid crystal TVs, a direct backlight shown in FIG. 2 is used.

The direct backlight shown in FIG. 2 is provided with a plurality of linear light sources 1 (fluorescent bulbs such as cold-cathode tubes) as a light source, a reflecting plate 2 disposed immediately beneath the plurality of linear light sources, a diffusing plate 3 for reducing luminance variation disposed immediately above the plurality of linear light sources, and, according to needs, a plurality of optical sheets 4 for achieving improvement of the front luminance or reduction of luminance variation of a liquid crystal display panel disposed also immediately above the plurality of linear light sources.

However, the cold-cathode tubes as the light sources 1 have tube surfaces with high luminance, and therefore, have a problem that in the case in which the distance between the light sources 1 and the diffusing plate 3 shown in FIG. 3 is short, there is caused the luminance variation on a screen of the liquid crystal display panel (not shown) mounted on the backlight to degrade the display quality. Therefore, it is necessary to assure the distance between the light sources and the diffusing plate as large as at least about the distance between the light sources, which makes it difficult to achieve the super low-profiling.

Incidentally, as a medium or small size liquid crystal display such as a laptop personal computer (hereinafter referred to as a notebook PC) or a mobile information terminal, there is used a side edge backlight shown in FIG. 4 as described in JP-A-4-162002. In the side edge backlight shown in FIG. 4, a linear light source (a fluorescent bulb such as a cold-cathode tube) or a plurality of point light sources (e.g., light emitting diodes) is used as the light source 1, and is disposed so as to be opposed to an end face (a side face) of a light guide plate 5 made of a translucent material. There are provided light diffusing dots 6 for reflecting, transmitting, and diffusing the light propagated inside thereof formed on the lower surface of the light guide plate, a reflecting plate 2 for reflecting the light disposed below the lower surface of the light guide plate, a diffusing sheet 7 having a sheet like shape for reducing the luminance variation disposed above the upper surface (a surface opposed to the liquid crystal display panel not shown) of the light guide plate, and, according to needs, a plurality of optical sheets 4 for improving the front luminance of the liquid crystal display panel disposed also above the upper surface of the light guide plate.

In the side edge backlight, since equalization of the luminance of the light emitted to the principal surface of the liquid crystal display panel can be achieved using the light guide plate, there is an advantage that the low-profiling is easier compared to the direct backlight.

Conventionally, as the light diffusing dots (hereinafter described as dots) for reflecting, transmitting, and diffusing the light in the light guide plate, there are formed white printed dots with a diameter of about 0.4 through 1.5 mm, machine-worked dots with a diameter of about 0.02 through 0.1 mm, or the like on the principal surface of the light guide plate. However, it has proved that it is very difficult to increase the light guide plate in size while keeping the small thickness by redesigning the light guide to have a diagonal size of 32-inch wide screen (the length of the light guide plate of about 720 mm) and a thickness of no greater than 3 mm in order for using the side edge backlight for a large-sized liquid crystal TV for the following reasons.

In the case with the normal white printed dots, since the ratio of "[light guide plate length]/[light guide plate thickness]" increases, it is necessary to significantly reduce the amount of light taken out by the dots in the light guide plate, in particular in the vicinity of the light source. Therefore, it is required to dramatically down-size the printed dots of the light guide plate in the vicinity of the light source. However, the printed dots are difficult to down-size, and cause a phenomenon that the dots become visualized, namely dots-visualization on the screen of the liquid crystal display panel in the vicinity of the light source in accordance with the down-sizing of the dots and significant drop in the coverage of the principal surface of the light guide plate caused by the down-sizing of the dots.

The machine-worked dots or the like are small in size, and therefore, the problem of dots-visualization is hard to occur. However, it is required to provide fine dots to a metal mold for forming the light guide plate corresponding the screen size of the large screen liquid crystal TV, and therefore, it is extremely difficult to manufacture the metal mold.

SUMMARY OF THE INVENTION

In the related art, there are many problems in the backlight technology (the backlight device), in particular in achieving the growth in size and the super low-profiling of the light guide plate therefor at the same time, and it is difficult to solve these problems.

The present invention is made for making a breakthrough of the existing situation, and has an object of providing a backlight technology capable of correcting the defects of the related art to achieve a large-sized and super low-profile light guide plate, thereby reducing the dots-visualization.

A first aspect of the liquid crystal display provided by the invention in order for achieving the object described above will be described as follows.

Specifically, the liquid crystal display includes a light guide plate having a pair of principal surfaces (e.g., an upper surface and a lower surface) and a plurality of side surfaces formed between the pair of principal surfaces, at least one light source disposed so as to be opposed to one of the side surfaces of the light guide plate, or a pair of the side surfaces of the light guide plate opposed to each other, a diffusing sheet disposed so as to be opposed to one of the principal surfaces (e.g., the upper surface) of the light guide plate, a liquid crystal display element disposed so as to be opposed to the one of the principal surfaces of the light guide plate via the diffusing sheet, and a reflecting sheet disposed so as to be opposed to the other of the principal surfaces (e.g., the lower surface) of the light guide plate, the other of the principal surfaces of the light guide plate is provided with a light diffusing dot adapted to diffuse light, which is input from the light source to the light guide plate, towards the respective principal surfaces of the light guide plate, and the light diffusing dot is formed so that a whiteness (whiteness of the dots) of a light source adjacent area located on the light guide plate on the light source side satisfies the following relationship $$71-0.32 \times LD+6.0 \times 10^{-4} \times LD^2-3.9 \times 10^{-7} \times LD^3 > [\text{whiteness}], \text{ and}$$

$$[\text{Whiteness}] > 20-0.11 \times LD+2.2 \times 10^{-4} \times LD^2-1.5 \times 10^{-7} \times LD^3.$$

Here, the LD described above is a dimensionless value determined by "LD=[light guide plate length]/[light guide plate thickness]," and [light guide plate length] and [light guide plate thickness] are defined as follow.

[Light guide plate length]=[a distance (unit: mm) from the one of the side surfaces to a side of the principal surface opposed to the one of the side surfaces via the principal surface of the light guide plate] in the case in which the light source is opposed to the one of the side surfaces, or [light guide plate length]=[a half of a distance (unit: mm) between the pair of the side surfaces] in the case in which the light sources are opposed respectively to the pair of side surfaces of the light guide plate opposed to each other, and [light guide plate thickness]=[a thickness (unit: mm) of the light guide plate in an area extending a distance of {[light guide plate thickness]/10} inside the principal surface from the one of the side surfaces of the light guide plate or one of the pair of the side surfaces opposed to each other].

In the liquid crystal display described above, it is preferable that the whiteness of the light guide plate in an area adjacent to the light source satisfies the following relationship with respect to the LD, $$41-0.19 \times LD+3.8 \times 10^{-4} \times LD^2-2.6 \times 10^{-7} \times LD^3 > [\text{whiteness}]$$

Further, if necessary, the light guide plate length is preferably equal to or greater than 720 mm, the light guide plate thickness is preferably 0.5 through 4 mm, and more preferably 1.6 mm through 3.5 mm.

A second aspect of the liquid crystal display provided by the invention will be described as follows.

Specifically, the liquid crystal display includes a light guide plate, at least one light source disposed so as to be opposed to a side surface or two side surfaces opposed to each other, a diffusing sheet disposed on an upper surface of the light guide plate, a liquid crystal display element disposed on the diffusing sheet, and a reflecting sheet disposed on a lower surface of the light guide plate, the lower surface of the light guide plate is provided with a plurality of dots adapted to diffuse light, which is input from the light source to the light guide plate, towards the upper surface and the lower surface of the light guide plate, and the dots formed on the lower surface of the light guide plate in the vicinity of the light source are each provided with a flat and smooth surface formed inside the dots so that the coverage in each of the dots formed in the vicinity of the light source is 60% through 80%.

For example, in the case in which circular colored dots are formed on the lower surface of the light guide plate, a transparent pattern (an area to be a flat and smooth surface) is formed at the center of each of the colored dots disposed in the light source adjacent area to form a colored pattern having a doughnut shape (a concentric circular shape).

It is preferable that a shape of each of the dots formed in the vicinity of the light source is defined by an inner circumference defining a periphery of the flat and smooth surface and an outer circumference disposed coaxial with the inner circumference, and a diameter L1 (unit: mm) of the inner circumference and a minimum value L2 (unit: mm) of a distance between the dots (e.g., a doughnut-shaped colored pattern) satisfy the following relationship, $$0.4 < L1/L2 < 0.6.$$

The dots formed on the lower surface of the light guide plate and in an area (a light source distant area) further from the light source than the area in the vicinity of the light source preferably have higher coverage than that of the dots formed in the vicinity of the light source, and it is preferable to form the colored patterns so that the coverage thereof becomes, for example, equal to or higher than 90%.

According to the backlight device of the present invention, since the growth in screen size and the super low-profiling of the light guide plate can be achieved at the same time, and further, the dots-visualization in the screen of the liquid crystal display panel caused therefrom can be prevented, there can be obtained an extremely superior advantage of achieving the large-sized screen and super low-profiling while particularly maintaining the image quality of the liquid crystal TV.

DESCRIPTION OF THE PREFERRED EMBODIMENTS

A backlight device (a side edge backlight) and a liquid crystal display equipped with the backlight device according to an embodiment of the present invention will hereinafter be explained with reference to accompanying drawings.

Figure 5A:
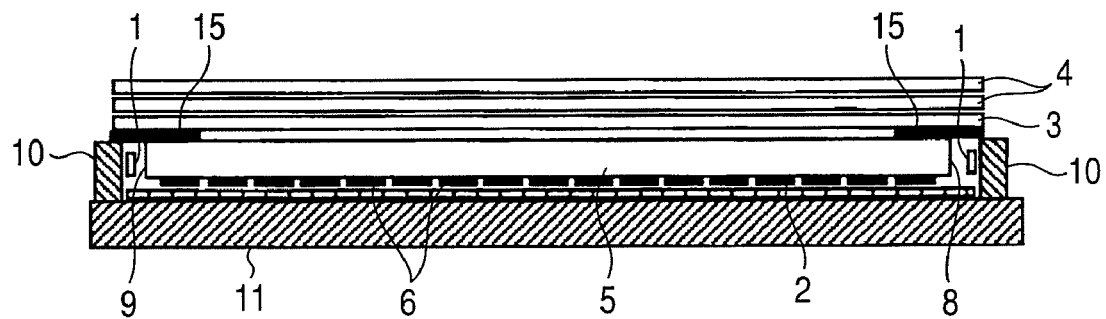
FIGS. 5A and 5B are diagrams for explaining a backlight device according to an embodiment of the present invention.
Figure 5B:
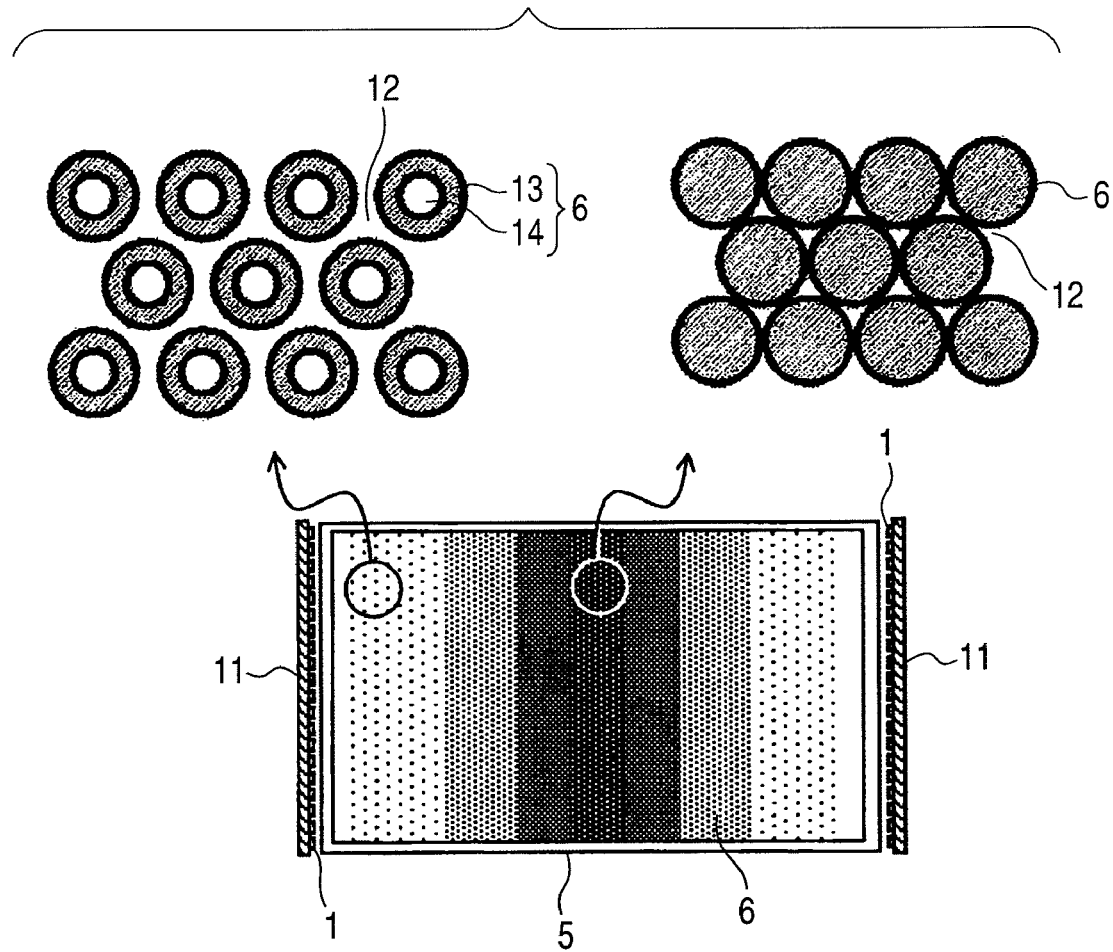

FIG. 5A is a cross-sectional view showing the backlight device according to the embodiment of the present invention. The dots 6 are formed on the lower surface of the light guide plate 5. FIG. 5B is a diagram for explaining the dots 6 formed on the lower surface of the light guide plate 5. The light source 1 formed of a linear light source (a fluorescent bulb such as a cold-cathode tube) or of a plurality of point light sources (e.g., light emitting diodes) arranged in a line is disposed so as to be opposed to an end face 8, an end face 9 on the opposite side, or both of the end faces 8 and 9 of the light guide plate 5 made of a translucent material. There are provided the reflecting plate 2 for reflecting light disposed below the lower surface of the light guide plate 5, the diffusing plate 3 for reducing the luminance variation disposed on the upper surface of the light guide plate, and, according to needs, a plurality of optical sheets 4 for improving the front luminance of the liquid crystal display panel disposed also on the upper surface of the light guide plate. Above the optical sheets 4, there is disposed the liquid crystal display panel (not shown) so that the principal surface thereof is opposed to the upper surface of the optical sheets 4.

Regarding the arrangement of the light source, although it is preferable to dispose the light sources respectively on a pair of side faces opposed to each other as shown in FIG. 5, it is also possible to dispose the light source only on one side. The reason that it is preferable to dispose the light sources on the pair of side faces opposed to each other is that the luminance can be doubled by disposing the light sources respectively on the pair of side faces opposed to each other. A light shielding member 15 is for preventing a component of the light from the light source 1 having failed to enter the light guide plate 5 from directly entering the liquid crystal display panel, and in the case with the backlight device having the light source 1 disposed along only one side of the light guide plate 5, the light shielding member 15 is disposed so as to cover the light source 1 and the periphery of the light guide plate 5 along the side.

Since the backlight device incorporating the light guide plate is incorporated in a large-sized liquid crystal television set (a liquid crystal TV), the length (the size in the longitudinal direction) of the light guide plate needs to correspond to the long side of a wide-screen liquid crystal display panel ((horizontal side):(vertical side)=16:9) with a diagonal size of at least 32 inches, and becomes about 720 mm at minimum. This length is determined in accordance with the screen size of the liquid crystal TV (the liquid crystal display panel).

The upper limit of the thickness of the light guide plate 5 is equal to or smaller than 4 mm, and preferably equal to or smaller than 3 mm. The reason is as follows. Since the outside diameter of the Cold-Cathode Fluorescent Lamp (hereinafter abbreviated as CCFL) used for the light source is 1.6 through 2 mmφ, and the chip size of the Light Emitting Diode (hereinafter abbreviated as LED) is 0.2 through 1 mm square, even if the thickness of the light guide plate 5 is set to be greater than 4 mm, a ratio of the incident light output from the light source and input to the light guide plate does not rise, but only the thickness of the backlight device increases in vain. In particular in the backlight device using the LEDs, it is preferable to set the thickness of the light guide plate 5 to be equal to or smaller than 3 mm. This is because, the chip size of the LED is 1 mm or more smaller than the size of the CCFL. The lower limit of the thickness of the light guide plate 5 is equal to or greater than 2 mm in the case with the CCFL, and equal to or greater than 0.5 mm in the case with the LED. If the thickness of the light guide plate 5 is set to be smaller than the above values, there arises a problem that the luminance of the backlight device (the liquid crystal display equipped with the backlight device) is lowered because of decrease in the ratio of the incident light from the light source 1 to the light guide plate 5.

Figure 6:
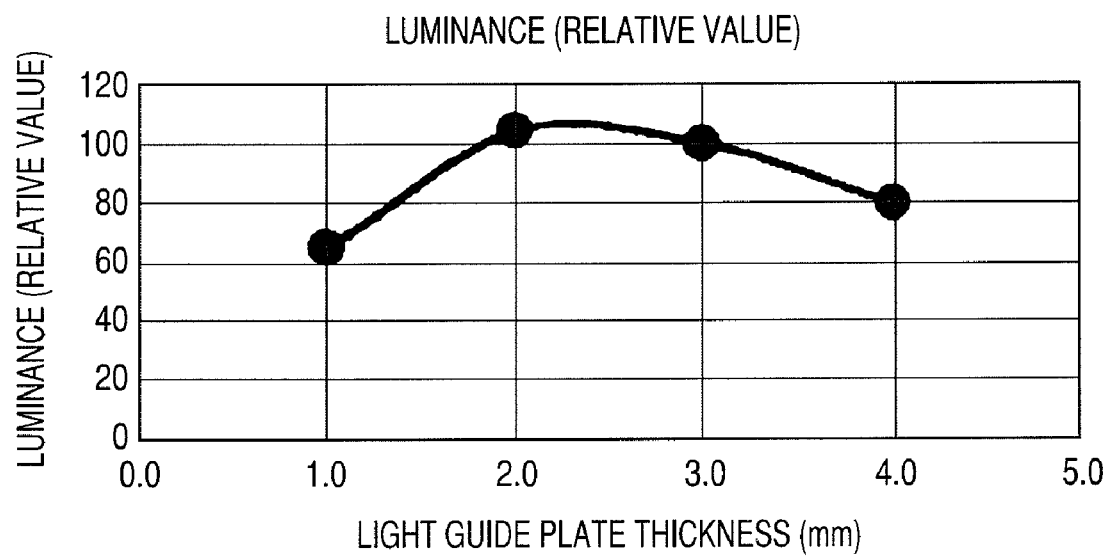
FIG. 6 is a diagram showing a relationship between the thickness of a light guide plate and the luminance.

It should be noted that in the backlight device in which the LEDs (the light sources 1) are disposed respectively on a pair of side faces (adjacent respectively to the short sides of the rectangular principal surface of the light guide plate 5) of the light guide plate 5 opposed to each other, the length (the size of the long side of the rectangular principal surface) of the light guide plate 5 is greater than about 720 mm, the light source 1 is thermally connected and mechanically fixed to a heat sink 10, and the heat sink is thermally connected and mechanically fixed to a frame (a housing of the backlight) or a radiation mechanism 11, the thickness of the light guide plate 5 is preferably 1.6 through 3.5 mm. FIG. 6 shows the result of measurement of the luminance (the intensity of the light provided to the liquid crystal display panel via the optical sheets 4) of the backlight device having the distance between the light guide plate and the light source of 1.25 mm, wherein the thickness of the light guide plate is in a range of 1.6 through 3.5 mm, the luminance becomes the highest. This is because, in the case in which the length of the light guide plate is equal to or greater than 720 mm, since the expansion of the light guide plate caused by the thermal expansion is about 1 mm, it is necessary to provide a gap of 1 through 1.5 mm between the LED and the light guide plate. Such a problem does not arise in the case in which the light source can be fixed to the light guide plate such as a monitor or a small-sized liquid crystal TV. In the case in which the LED light sources are disposed respectively on the pair of side faces opposed to each other, and the light sources are thermally connected and mechanically fixed to the heat sink 10, and the frame or the radiation mechanism 11, since the light guide plate and the light sources are not fixed to each other, the range of the thickness of the light guide plate described above is important.

In the backlight device according to the present invention, there are formed a plurality of light diffusing dots (hereinafter referred to as dots) for diffusing the light guided in the light guide plate on the lower surface of the light guide plate 5. As shown in FIG. 5B, the lower surface of the light guide plate 5 includes the dots 6 and a portion (hereinafter referred to as a non-dot formation surface 12) on which no dots are formed, and the dots 6 formed in an area adjacent to the light source 1 of the lower surface (one of the principal surfaces of the light guide plate 5) are each formed of a dot diffusing section 13 and a dot non-diffusing section 14.

The non-dot formation surface 12 exists outside the outer circumferential shape of one of the dots 6, and at the same time, forms an outer peripheral area of the outer circumferential shape of another (adjacent to said one of the dots 6) of the dots 6. In other words, the plurality of dots 6 formed on the principal surface of the light guide plate 5 is separated from each other by the non-dot formation surface 12. The non-dot formation surface 12 is a surface obtained by substantially executing mirror finish on the translucent material forming the light guide plate 5. The dot non-diffusing section 14 is a part formed by executing substantial mirror finish on the translucent material forming an inside area (an area surrounded by the dot diffusing section 13) of the dot diffusing section 13. It is preferable that the proportion (the area ratio) of the dot non-diffusing section 14 to the dot diffusing section 13 is decreased as the distance between the dots 6 consisting thereof and the light source increases, and is finally (in the dot 6 furthest from the light source 1) set to 0.

Figure 1:
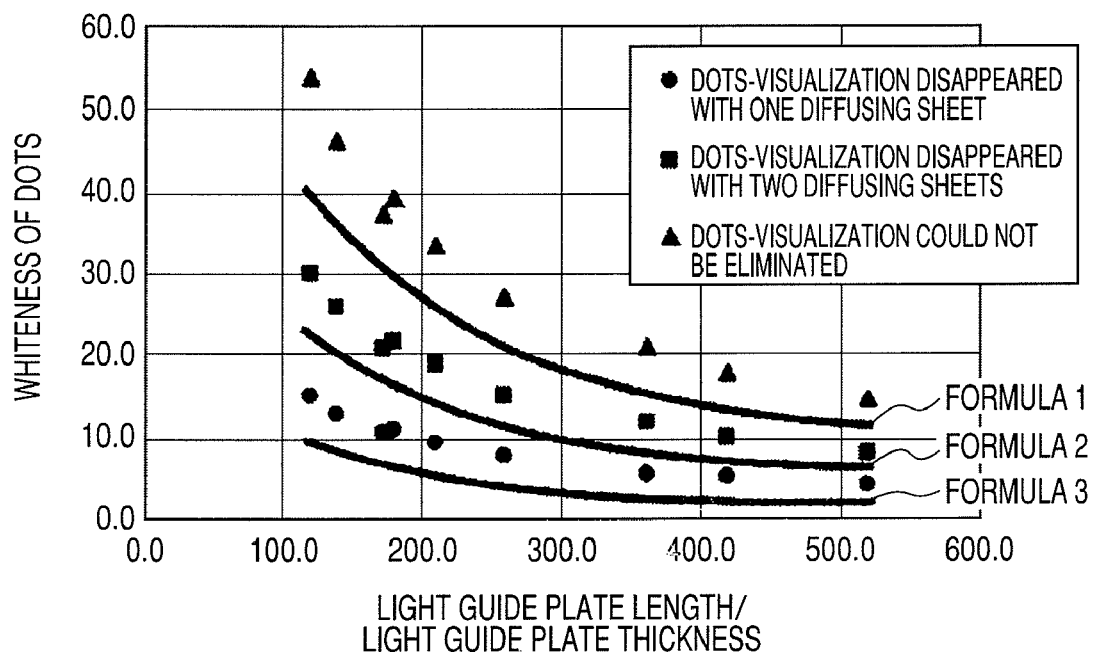
FIG. 1 is a diagram for explaining a whiteness range in the present invention.
Figure 2:
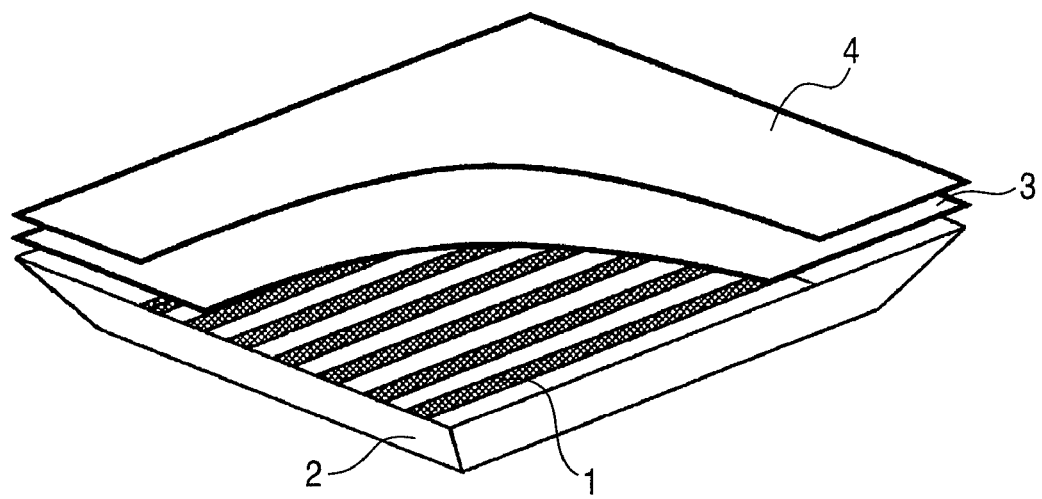
FIG. 2 is a structural diagram of a direct backlight.
Figure 3:
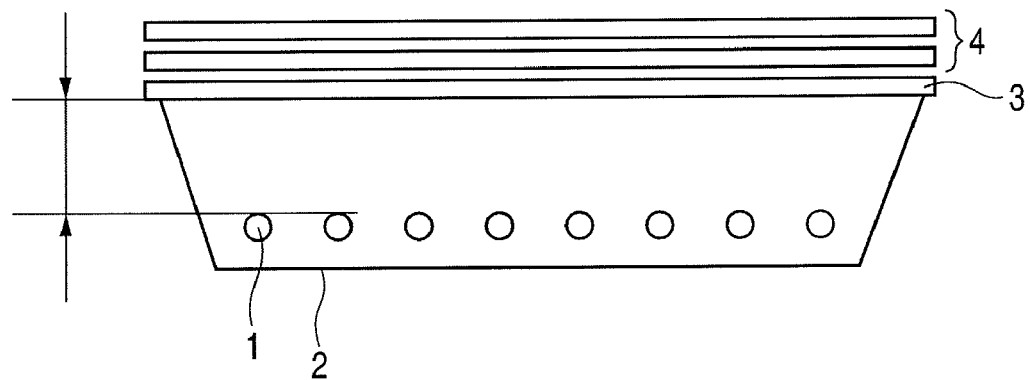
FIG. 3 is a diagram for explaining a problem in low-profiling of the direct backlight.
Figure 4:
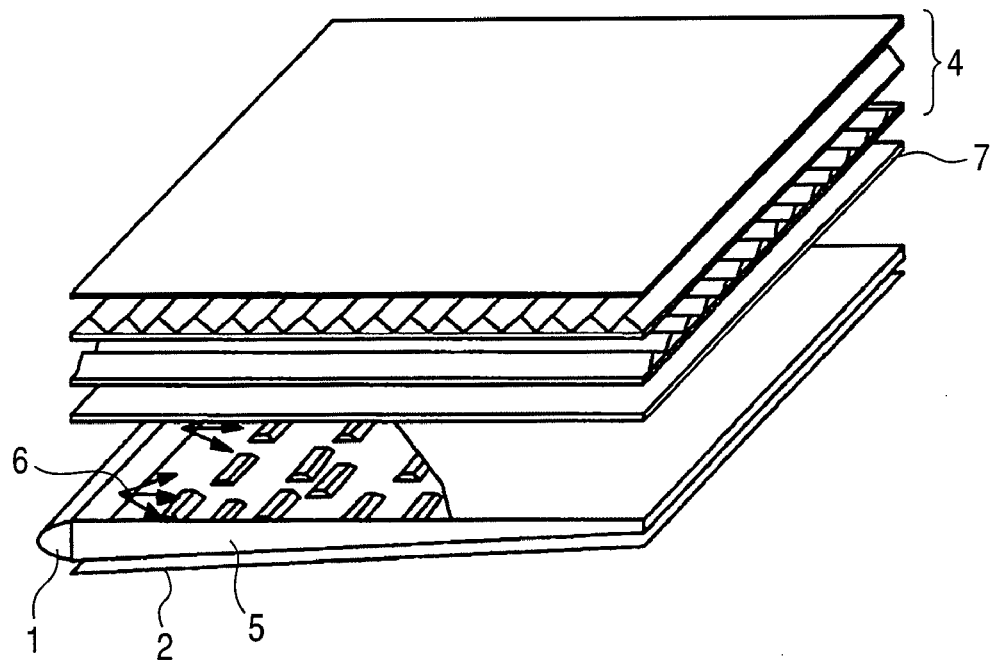
FIG. 4 is a structural diagram of a side edge backlight.

Further, as a standard for determining the shapes of the dots 6 respectively formed in the area (hereinafter referred to as a light source adjacent area) near the light source 1 and the other area of the principal surface (the lower surface) of the light guide plate 5, a parameter of "whiteness" in the light source adjacent area of the light guide plate 5 provided with the dots 6 is looked up. FIG. 1 shows three curves representing a relationship between a ratio LD (dimensionless value) obtained by dividing the thickness (unit: mm (millimeter)) of the light guide plate 5 by the length (unit: mm) thereof and the "whiteness" mentioned above. The variation in "whiteness" represented by the curves is based on the following formulas 1 through 3.

$$[\text{Whiteness}] = 71 - 0.32 \times LD + 0.00060 \times LD \times LD - \quad (1)$$
$$0.00000039 \times LD \times LD \times LD$$
$$= 71 - 0.32 \times LD + 6.0 \times 10^{-4} \times LD^2 -$$
$$3.9 \times 10^{-7} \times LD^3$$

$$[\text{Whiteness}] = 41 - 0.19 \times LD + 0.00038 \times LD \times LD - \quad (2)$$
$$0.00000026 \times LD \times LD \times LD$$
$$= 41 - 0.19 \times LD + 3.8 \times 10^{-4} \times LD^2 -$$
$$2.6 \times 10^{-7} \times LD^3$$

$$[\text{Whiteness}] = 20 - 0.11 \times LD + 0.00022 \times LD \times LD - \quad (3)$$
$$0.00000015 \times LD \times LD \times LD$$
$$= 20 - 0.11 \times LD + 2.2 \times 10^{-4} \times LD^2 -$$
$$1.5 \times 10^{-7} \times LD^3$$

wherein LD=[light guide plate length]/[light guide plate thickness].

Figure 8A:
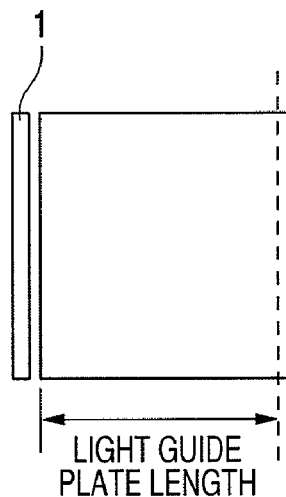
FIGS. 8A and 8B are diagrams for explaining the length of the light guide plate.
Figure 8B:
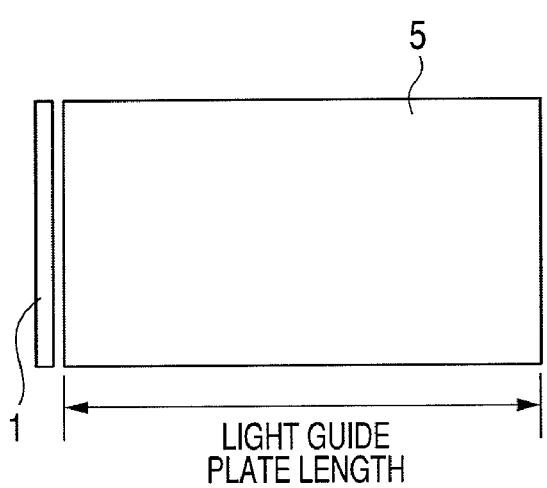

The thickness of the light guide plate 5 in the vicinity of the light source (the light source adjacent area) is used as the thickness of the light guide plate 5. In the case in which the light sources are disposed respectively on both sides of the light guide plate 5 opposed to each other as shown in FIG. 8A, the length of the light guide plate 5 is defined to be a half of the length thereof in a direction traversing (perpendicular to) each of the both sides (hereinafter referred to as a direction perpendicular to the light source side), and in the case in which the light source is disposed only on one of the side faces as shown in FIG. 8B, the length of the light guide plate 5 is defined as the length of the light guide plate in the direction traversing (perpendicular to) the side of the light guide plate opposed to the light source (hereinafter also referred to as a direction perpendicular to the light source side). For example, in the case in which the light source 1 is disposed so as to be opposed to a first side of the light guide plate 5 having a rectangular principal surface, the "length of the light guide plate 5" is calculated as the size of either one of the pair of second sides adjacent (extending from the both ends of the first side) to the first side. In most light guide plates 5, the first and second sides are described as "a short side" and "a long side," respectively. For example, in a backlight device for a wide-screen liquid crystal TV with a diagonal size of 32 inches, the length of the second side of the light guide plate 5 opposed to the light sources 1 on the first sides is 720 mm, the "length" of the light guide plate 5 opposed to the light sources 1 on the pair of first sides opposed to each other, respectively, is obtained as a half of the length of the second side.

The size of the dot 6 is discussed as "a diameter" of a circular dot. The size of the dot 6 showing a shape other than a circular shape is discussed as "a diameter" of a circular dot having the same area as the dot 6 as a replacement. The whiteness values obtained by the formulas 1 through 3 are realized by adjusting the outer circumferential shape (hereinafter referred to as a dot shape) of the dot formed in the light source adjacent area of the light guide plate 5. Hereinafter, the whiteness will be explained as "dots-whiteness."

The whiteness of the dot is calculated from [light taking-out ratio ($\theta$)] of the light guide plate as the ratio between the intensity ([incident light ($\theta$)] described below) of the light input from the side surface of the light guide plate, and the intensity of the light input to the light guide plate and then emitted from the principal surface (the light exit surface opposed to the liquid crystal display panel) of the light guide plate. Emission intensity is defined as a sum of the component (transmitted light) of the light propagating inside the light guide plate transmitted to the light exit surface described above and the component (reflected light) thereof reflected by a pattern and so on provided to the light guide plate. In the backlight device according to the present invention, the "reflected light" described above can be specified as a component reflected towards the light exit surface at an angle equal to or smaller than 40 degrees (40°) with the perpendicular (normal) line of the surface (e.g., the other of the principal surfaces opposed to the light exit surface described above, hereinafter described as a dot formation surface) provided with the dots 6 of the light guide plate 5. [Light taking-out ratio ($\theta$)] is defined as follows with such intensities [incident light ($\theta$)], [reflected light] and [transmitted light].

[Light taking-out ratio ($\theta$)]={([reflected light]+[transmitted light])/[incident light ($\theta$)]}×100.

The intensity [incident light ($\theta$)] varies in accordance with the angle $\theta$, at which the light enters the side surface of the light guide plate, and the value of [light taking-out ratio ($\theta$)] varies accordingly. The whiteness of the dot can be obtained by calculating the [light taking-out ratio ($\theta$)] while varying the incident angle $\theta$ from 0 degree (0°, the incident angle perpendicular to the side surface of the light guide plate) to 90 degrees (90°), and then obtaining the weighted average of the [light taking-out ratio ($\theta$)] in accordance with the occurrence rate (increase and decrease in the [incident light ($\theta$)] with respect to the angle $\theta$).

Figure 7:
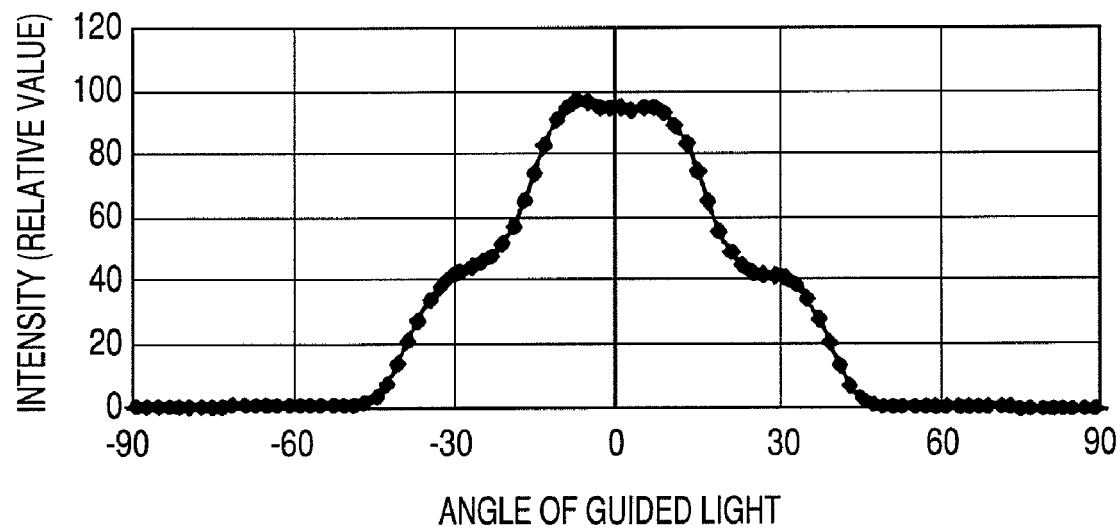
FIG. 7 is a diagram for explaining an angle distribution of light guided inside the light guide plate.

The reason for defining the whiteness of the dot as described above is as follows. The reflected light and the transmitted light emitted from the light guide plate show various diffusing patterns in accordance with a manufacturing method of the dots in the light guide plate and the incident angle of the incident light. Regarding the reflected light, since the critical angle of a typical translucent material is 40 through 45 degrees (40° through 45°), in the case in which the angle formed between the perpendicular line of the dot formation surface of the light guide plate 5 and the reflected light is equal to or smaller than 40 degrees (40°), the reflected light is taken out from the light guide plate to be the illumination light for illuminating the liquid crystal display panel. The transmitted light includes the component which is once taken out from the dot formation surface of the light guide plate 5 to the outside thereof, reflected by the reflecting sheet (the reflecting plate 2), input again to the light guide plate 5 from the dot formation surface, and finally emitted from the light exit surface to the outside of the light guide plate 5. Therefore, although the loss caused by the reflecting sheet or transmission through the light guide plate depending on the light path is observed in some component of the transmitted light emitted from the light guide plate 5, the almost entire transmitted light becomes the illumination light for illuminating the liquid crystal display panel. Therefore, the whiteness of the dot can be obtained by calculating the weighted average of the [light taking-out ratio ($\theta$)] in accordance with the occurrence rate of the light guided in the light guide plate to be the incident light. FIG. 7 shows an average incident angle distribution of the light guided in a typical light guide plate just for reference.

Incidentally, the "light source adjacent area" as an area the dot whiteness of which is adjusted by the dots 6 to be formed thereon in the backlight device (the light guide plate) according to the present invention is in a range of about 10% of the light guide plate length from the light entrance surface. The reason for defining the light source adjacent area as described above is that the source light adjacent area is an area where the dots-visualization occurs most easily because the dot coverage becomes the lowest of the light guide plate since the light source adjacent area is adjacent to the light source, and because the dots light brightly since the amount of light guided in the light guide plate is large.

One of the subject-matters of the present invention is to adjust the shapes and the arrangement of the dots 6 formed in the light source adjacent area of the light guide plate 5 in accordance with the [light guide plate length] and the [light guide plate (the light source adjacent area thereof) thickness], thereby limiting the whiteness of the dots in the light source adjacent area within a range equal to or smaller than the whiteness value determined by the formula 1 described above and equal to or greater than the whiteness value determined by the formula 3 described above. Preferably, the whiteness of the dots in the light source adjacent area is limited to equal to or smaller than the whiteness value determined by the formula 2 described above. The grounds for introducing the standard based on the formulas 1 through 3 in the backlight device and the liquid crystal display according to the present invention will hereinafter be explained with reference to FIG. 1.

The inventors of the present invention prepared light guide plates (having different values of LD described above) with various outer shapes, and varied the shapes and arrangements of the dots formed respectively thereon. Thus, even in the light guide plates showing the same LD, the dot whiteness thereof was different between the light guide plates in accordance with the shapes and the arrangements of the dots formed thereon. As described above, the "dots-visualization (visualization of the dots 6 in the displayed image)" in the light source adjacent area of the liquid crystal display panel (the display screen) was evaluated while varying the whiteness of the dots and [light guide plate length]/[light guide plate thickness] (the LD value) of the light guide plates 5, and illuminating the liquid crystal display panel by the backlight device incorporating each of the light guide plates 5.

The circular, rectangular, or triangular points plotted on the graph shown in FIG. 1 reflect the diversity of the combinations of the dot whiteness and the LD value of the light guide plates 5 prepared by the inventors of the present invention. Among these combinations, in the case with the backlight device equipped with the light guide plate 5 corresponding to the circular points, the dots-visualization in the display screen (hereinafter referred to as a screen) of the liquid crystal display panel disappeared by only inserting one diffusing sheet (the diffusing plate 3 shown in FIG. 5A) between the light guide plate 5 and the liquid crystal display panel. In the backlight device equipped with the light guide plate 5 corresponding to the rectangular points, the dots-visualization in the screen disappeared by inserting two diffusing sheets between the light guide plate 5 and the liquid crystal display panel. The light guide plate 5 corresponding to the triangular points was provided with the conventional printed dots, and even by inserting three diffusing sheets between the backlight device equipped with this light guide plate 5 and the liquid crystal display panel, the dots-visualization in the screen could not be eliminated. After studying these data in various manners, the inventors of the present invention concluded that if the light guide plate 5 showed the dot whiteness smaller than the formula 1, the backlight device equipped with the light guide plate 5 and combined with the two diffusing sheets could prevent the dots-visualization in the screen of the liquid crystal display panel, and further, if it showed the dot whiteness smaller than the formula 2, the backlight device equipped with this light guide plate 5 and combined with the one diffusing sheet could prevent the dots-visualization in the screen of the liquid crystal display panel. In the liquid crystal display represented by liquid crystal TVs, at least one diffusing sheet or diffusing plate is inserted between the liquid crystal display panel and the backlight device in order for equalizing the luminance of the screen of the liquid crystal display panel. Further, if the two diffusing sheets are inserted therebetween, only little influence is exerted on the low-profiling of the entire backlight device, and only negligible small reduction in luminance of illumination on the liquid crystal display panel is caused.

In contrast, if the dots 6 provided to the light guide plate 5 suppress the dot whiteness to a value smaller than the formula 3, the intensity of the light emitted by the backlight device equipped with this light guide plate 5 to the liquid crystal display panel is attenuated to significantly lower the luminance of the screen of the liquid crystal display panel. Therefore, such a backlight device is not available for liquid crystal TVs. Therefore, by limiting the whiteness of the dots in the light guide plate 5 in the range between the formula 1 and the formula 3, it becomes possible to effectively eliminate the dots-visualization from the screen of the liquid crystal display panel, thereby improving the display quality of the screen.

As a method of providing the dots 6 to the light guide plate 5 so as to provide the whiteness of the dots described above to the light guide plate 5, there can be applied a method of providing the dots to the light guide plate by injection molding using a metal mold with a surface roughened by sandblasting or etching, or a method of applying resin mixed with traces of diffusing agent on a surface of a substrate (e.g. a resin member) to be the light guide plate using inkjet printing.

Figure 14:
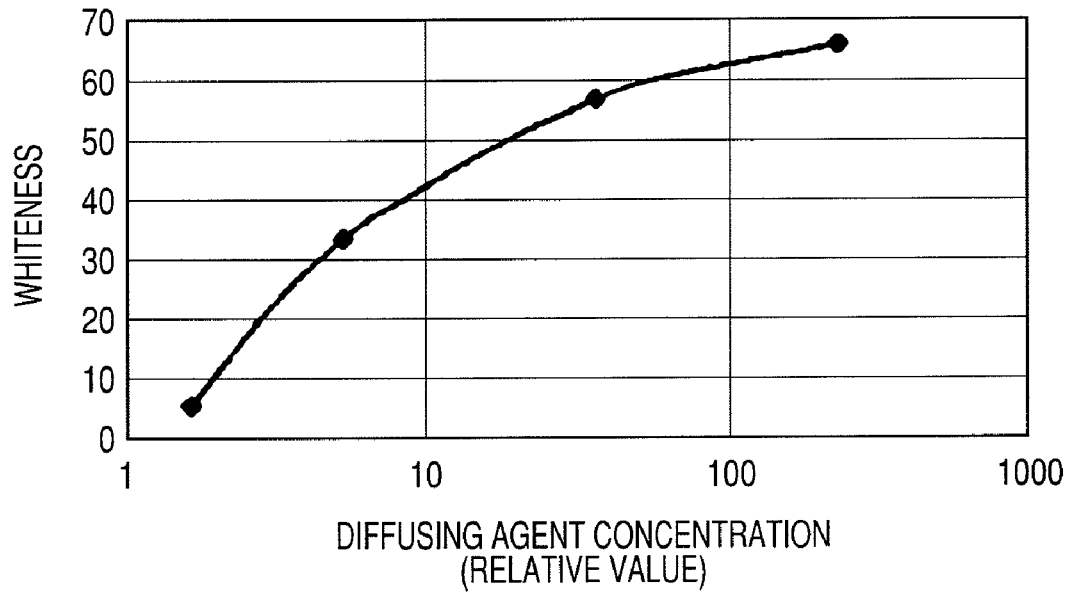
FIG. 14 is a diagram for explaining a relationship between the diffusing agent concentration and the whiteness of the dots.

In the present embodiment, the printed dots are formed on the principal surface of the light guide plate while varying the amount of the diffusing agent included in the ink used for the printing, thus the dots with desired whiteness are formed separately in accordance with the areas of the principal surface. FIG. 14 shows an example of the relationship between the concentration of the diffusing agent included in the ink and the whiteness of the dots formed by applying the ink with the measured values.

Here, the reason for forming the dot non-diffusing section 14 inside the dot diffusing section 13 in the light source adjacent area will be explained. The light guide plate is normally required to increase the coverage of the dots by increasing the dot size or by increasing the density of the dots as the distance from the light source increases in order for equalizing the luminance distribution in the light exit surface. However, in the case in which the whiteness of the dots is limited to a small value as is the case with the present invention, there arises a problem that even if the coverage of the dots is increased to nearly 100%, the performance of taking out the light from the area distant from the light source becomes insufficient, and thus the intensity of the light for illuminating the liquid crystal display panel, in other words, the efficiency of the backlight in the liquid crystal display is lowered.

Figure 9:
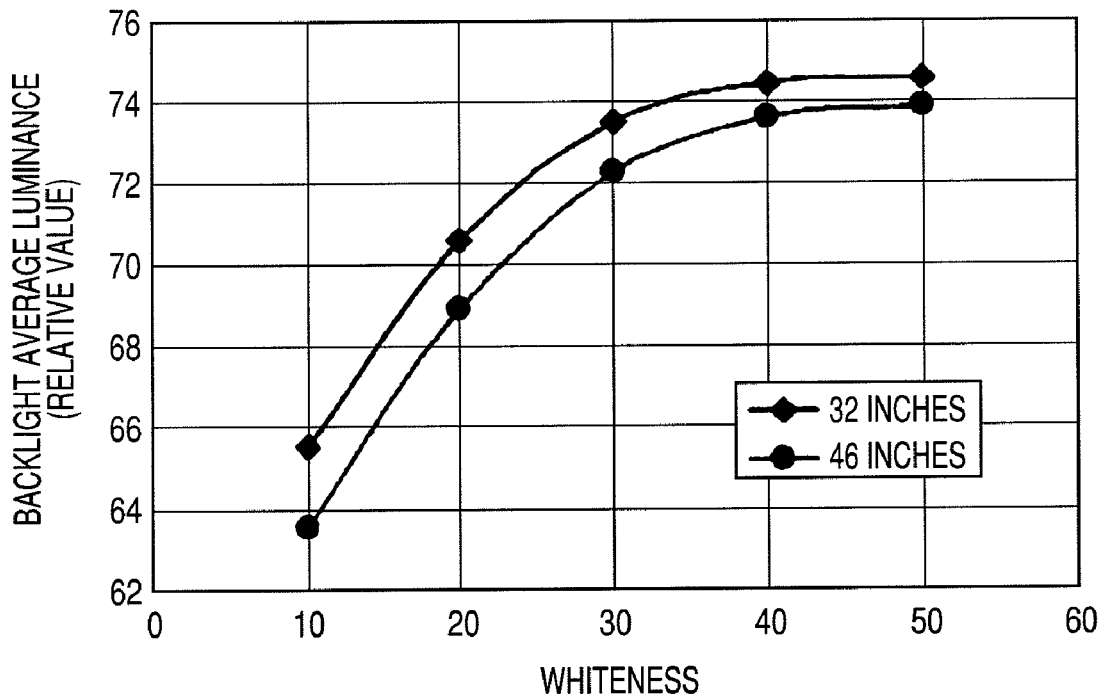
FIG. 9 is a diagram for explaining a relationship between average luminance of the backlight and the whiteness.

FIG. 9 is a graph showing a relationship between the backlight average luminance and the whiteness of the dots in the case in which the dot formed on the principal surface of the light guide plate 5 has a circular shape, each of the dots disposed in the light source adjacent area is not provided with the dot non-diffusing section (not formed to have a so-called doughnut shape), and the whiteness of the dots is varied in the light source adjacent area.

It is obvious from FIG. 1 that the whiteness needs to be set to 30 in order for preventing the dots-visualization in the screen of the liquid crystal display panel illuminated via the light guide plate with a thickness of 3 mm and used for the liquid crystal TV having a diagonal size of 32 inches. However, the average luminance of the liquid crystal display panel illuminated by the light emitted from the light guide plate 5 provided with such dots becomes slightly lower than the average luminance of the liquid crystal display panel illuminated by the light emitted from the light guide plate 5 provided with the dots for providing the higher whiteness than the present whiteness. In the light guide plate with a thickness of 3 mm and used for the liquid crystal TV having a diagonal size of 46 inches, since it is necessary to control the whiteness to be around 20 in order for preventing the dots-visualization in the screen of the liquid crystal display panel illuminated via this light guide plate, the average luminance of the liquid crystal display panel illuminated by the light emitted from this light guide plate 5 is further significantly lowered.

Figure 10:
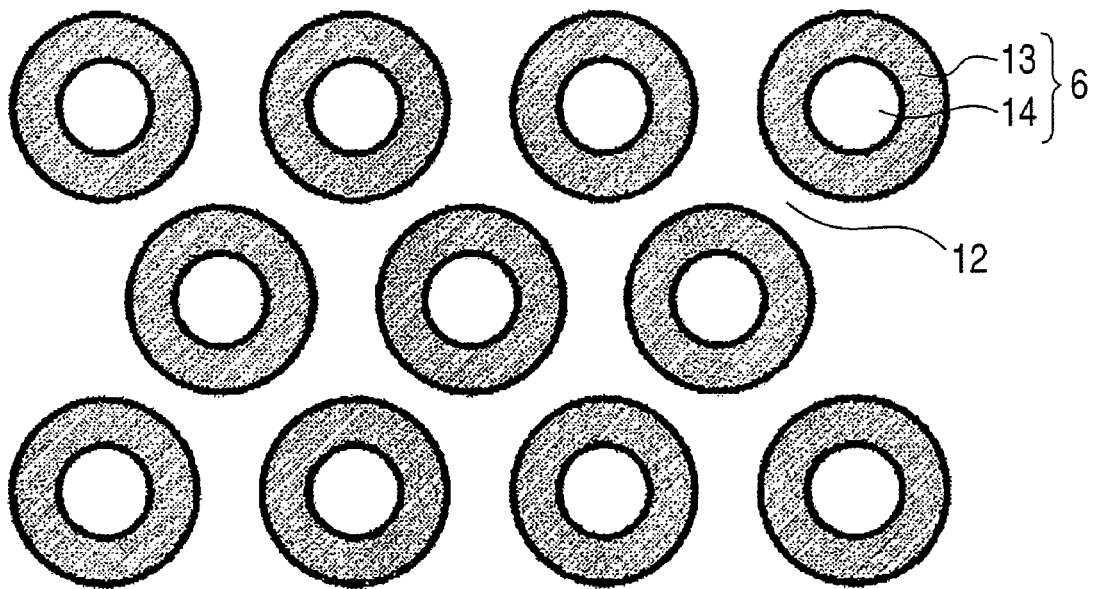
FIG. 10 is a diagram for explaining an example of a dot shape.

In order for avoiding this problem, the dots each having a substantially concentric-ring shape (a so-called doughnut shape) as shown in FIG. 10 are formed on the principal surface of the light guide plate in the light source adjacent area so as to be preferably arranged in a so-called zigzag manner. On the principal surface of the light guide plate 5 in the area called the light source adjacent area, there is formed a plurality of dots 6 separated by the non-dot formation surface 12, and each of the dots 6 is provided with the dot diffusing section 13 and the dot non-diffusing section 14 surrounded by the dot diffusing section 13. The dot diffusing section 13 is discriminated from the non-dot formation surface 12 and the dot non-diffusing section 14 as an area having a reflectance and a refractive index different therefrom, or a colored area. It is preferable to form a flat and smooth surface inside (the dot non-diffusing section 14) of each of the dots 6 for reducing the whiteness (the whiteness of the dots) in the light source adjacent area.

Figure 11:
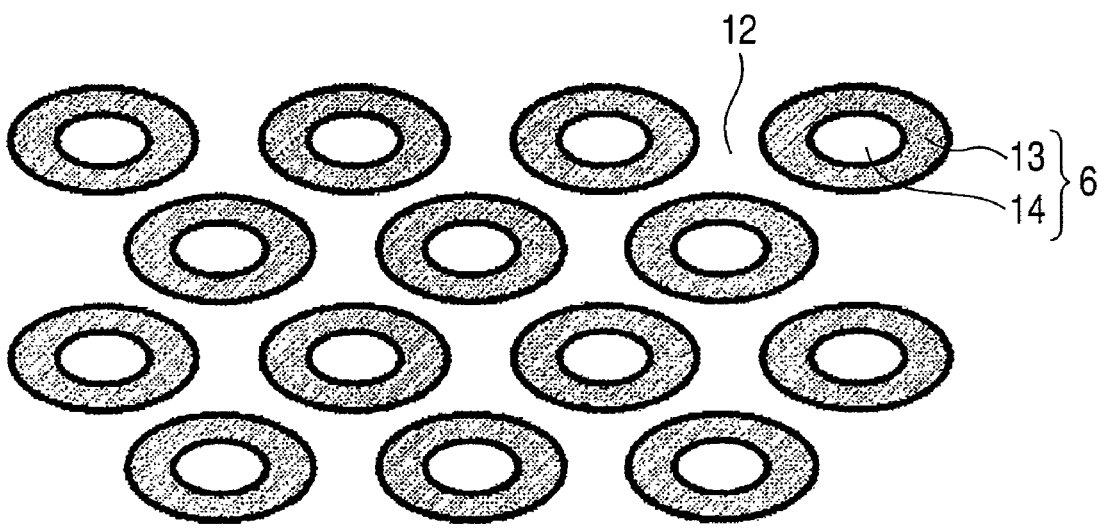
FIG. 11 is a diagram for explaining another example of the dot shape.

In the case with the concentric rings shown in FIG. 10, in-dot coverage is defined as "[in-dot coverage]=([outer circle area]−[inner circle area])/[outer circle area]." The inner circle area corresponds to the area of the dot non-diffusing section 14, and the outer circle area corresponds to the sum of the areas of the dot non-diffusing section 14 and the dot diffusing area 13. The shape of each of the dots 6 can be a concentric ellipse ring as shown in FIG. 11 or the like besides the concentric ring, and further, the dot diffusing section 13 formed of various shapes such as a polygon frame represented by a rectangular frame can also be adopted. With the view of the above description, the in-dot coverage can further be generalized, and defined as the following formula.

[In-dot coverage]=([dot area]−[inner flat and smooth surface area])/[dot area]

Further, the ratio of the dot non-diffusing section in the principal surface of the light guide plate is gradually lowered in accordance with the distance from the light source (the side surface of the light guide plate opposed thereto) so that the in-dot coverage becomes substantially 100% in the area (light source distant area) of the light guide plate the furthest from the light source. In order for maintaining the average luminance in the area of the principal surface of the light guide plate distant from the light source, it is recommended to make the in-dot coverage in that area equal to or higher than 90%.

By thus varying the in-dot coverage, it is possible to achieve the substantially high whiteness in the area of the light guide plate the furthest from the light source while maintaining the whiteness in the light source adjacent area of the light guide plate within the range between the curve of the formula 1 and the curve of the formula 3. Therefore, the dots-visualization in the screen of the liquid crystal display panel is prevented while maintaining the average luminance of the backlight, and further, the luminance variation in the screen is also eliminated.

Figure 12:
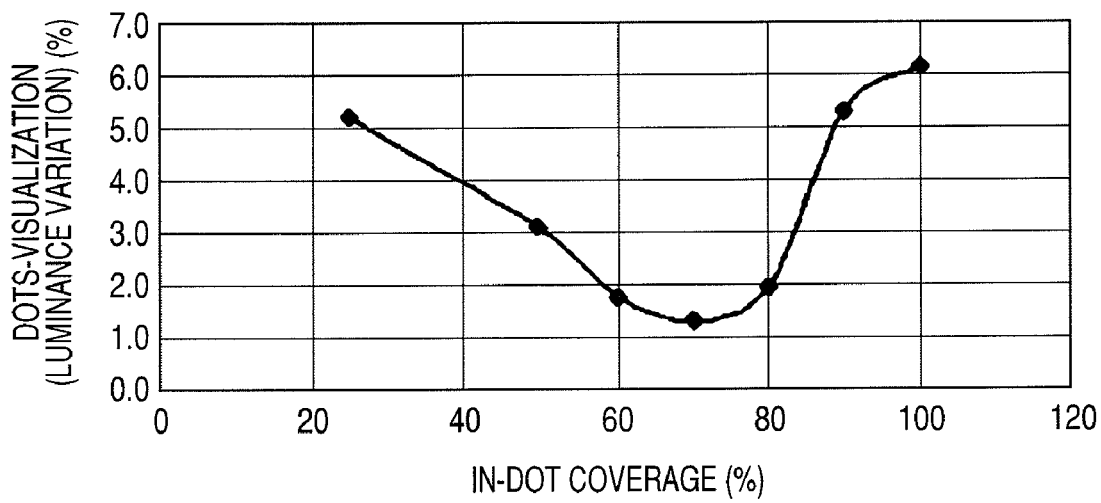
FIG. 12 is a diagram for explaining a relationship between in-dot coverage and the dots-visualization.

FIG. 12 is a graph used for reviewing the dots-visualization in the liquid crystal display panel illuminated by the light emitted from a "light guide plate corresponding to a screen with a diagonal size of 46 inches" having a thickness of 3 mm and provided with the dots having the whiteness of 30 in the reduction of 100% of the in-dot coverage. The dots provided to the light guide plate have the in-dot coverage lowered by the mirror section formed inside thereof, and thus the whiteness of the light guide plate is suppressed to 30. The light guide plate has the dots formed in the light source adjacent area and having the in-dot coverage adjusted to 60% through 80%, thereby preventing the dots-visualization in the liquid crystal display panel, and at the same time, the light guide plate is provided with the dots for adjusting the whiteness of the light guide plate to be 30 formed in the area of the light guide plate (the principal surface) far from the from the light source, thereby preventing drop of the emission efficiency of the light from the light guide plate as shown in FIG. 9. The function of the light guide plate as described above can be found substantially similarly in the light guide plates corresponding to other screen sizes than the diagonal size of 46 inches, or with different thicknesses. In either light guide plate, the in-dot coverage recommended for the dots formed in the light source adjacent area is in the range of 60% through 80%.

Figure 13:
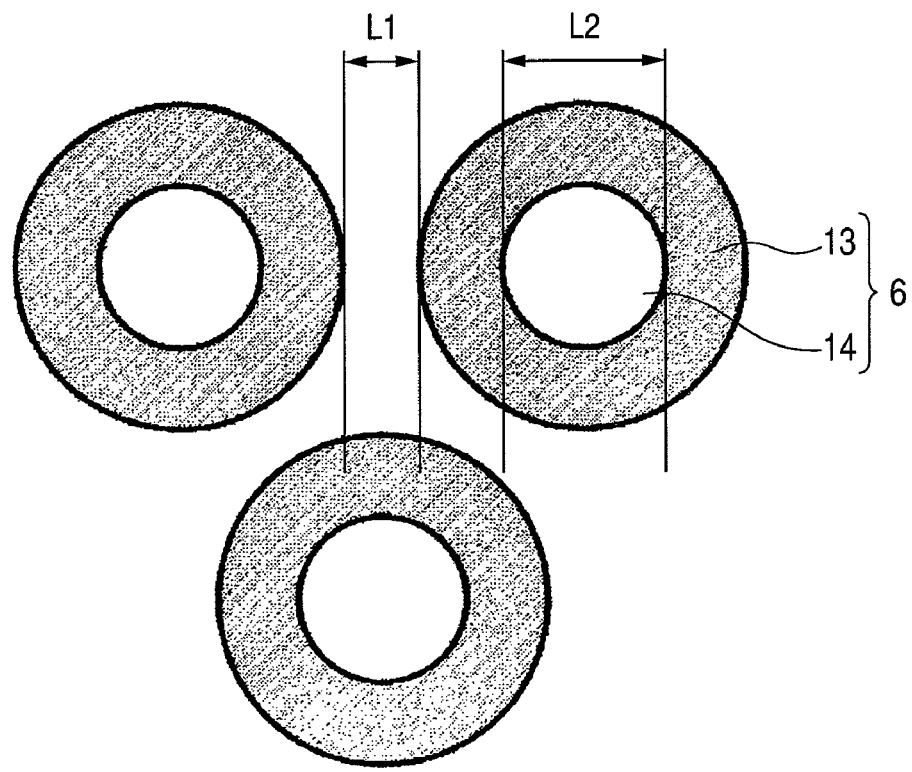
FIG. 13 is a diagram for explaining L1 and L2.
Figure 15:
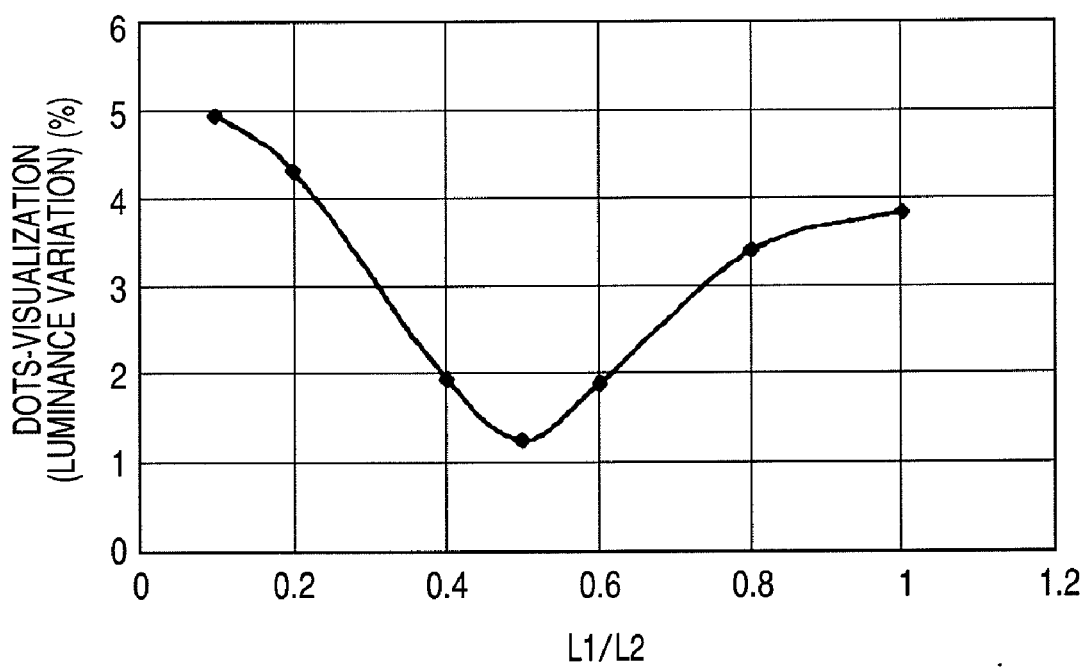
FIG. 15 is a diagram for explaining a relationship between the ratio between L1 and L2, and the dots-visualization.

In the case in which the dots 6 are formed to have a concentric ring shape, defining L1 and L2 as shown in FIG. 13, a relationship between the size of the outer circle (the contour of the dot diffusing section 13) and the size of the inner circle (the contour of the dot non-diffusing section 14) is preferably arranged to satisfy "0.4<L1/L2<0.6" as shown in FIG. 15. In FIG. 13, L1 is described as the minimum value (unit: mm) of the distance between the adjacent dots 6 (the dot diffusing sections 13 of the dots), and L2 is described as the diameter (unit: mm) of the dot non-diffusing section 14 (the contour thereof) in the individual dot 6. Since the principal surface (in particular in the light source adjacent area) of the light guide plate is provided with the plurality of dots 6 arranged in a zigzag manner, one of the dots is surrounded by six other dots adjacent thereto. The value of L1 is provided as the minimum distance between the "one of the dots" and "either one of the six other dots."

FIG. 15 shows a relationship between the "dots-visualization" in the screen of the liquid crystal display panel illuminated by the backlight device equipped with the light guide plate provided with the dots 6 shown in FIG. 13 and "L1/L2" (a dimensionless value obtained by dividing L1 by L2) related to the size and the arrangement of the dots 6. The light guide plate has the principal surface (the upper surface) having a size corresponding to the liquid crystal display panel with a diagonal size of 46 inches, and has a thickness of 3 mm in the section (the light source adjacent area, also referred to as the vicinity of the light entrance section) opposed to the light source. In the light source adjacent section, there are formed the dots 6 so that the whiteness thereof becomes 20. A similar tendency to the evaluation result of "the dots-visualization with respect to the shapes and the arrangement of the dots 6" shown in FIG. 15 obtained by this light guide plate is observed in other light guide plates different in size and thickness from this light guide plate. Therefore, the effect of eliminating the "dots-visualization" in the screen of the liquid crystal display panel obtained when L1 and L2 are arranged to satisfy "0.4<L1/L2<0.6" reappears in the various liquid crystal display equipped with the backlight device (the light guide plate) according to the present invention.

According to the present invention described above, since there is realized a high-luminance backlight (a backlight device) capable of efficiently preventing the dots-visualization in the screen of the liquid crystal display panel in the vicinity of the light source and of significantly enhancing the display contrast of the screen, as a result, the display quality of the display device is improved, and the luminance drop of the moving image displayed by the black-insertion drive or the overdrive operation of the liquid crystal TV can also be eliminated.

What is claimed is:

1. A liquid crystal display comprising:
a light guide plate having a pair of principal surfaces and a plurality of side surfaces formed between the pair of principal surfaces;
at least one light source disposed so as to be opposed to one of the side surfaces of the light guide plate, or a pair of the side surfaces of the light guide plate opposed to each other;
a diffusing sheet disposed so as to be opposed to one of the principal surfaces of the light guide plate;
a liquid crystal display element disposed so as to be opposed to the one of the principal surfaces of the light guide plate via the diffusing sheet; and
a reflecting sheet disposed so as to be opposed to the other of the principal surfaces of the light guide plate,
wherein the other of the principal surfaces of the light guide plate is provided with a light diffusing dot adapted to diffuse light, which is input from the light source to the light guide plate, towards the respective principal surfaces of the light guide plate, and
the light diffusing dot is formed so that a whiteness of the light guide plate in the vicinity of the light source satisfies the following relationship, $$71-0.32\times LD+6.0\times 10^{-4}\times LD^2-3.9\times 10^{-7}\times LD^3 > [\text{whiteness}], \text{ and}$$

$$[\text{Whiteness}] > 20-0.11\times LD+2.2\times 10^{-4}\times LD^2-1.5\times 10^{-7}\times LD^3,$$

LD=[light guide plate length]/[light guide plate thickness],

[Light guide plate length]=[a distance (unit: mm) from the one of the side surfaces to a side of the principal surface opposed to the one of the side surfaces via the principal surface of the light guide plate] in the case in which the light source is opposed to the one of the side surfaces, or =[a half of a distance (unit: mm) between the pair of the side surfaces] in the case in which the light sources are opposed respectively to the pair of the side surfaces of the light guide plate opposed to each other, and

[Light guide plate thickness]=[a thickness (unit: mm) of the light guide plate in an area extending a distance of {[light guide plate thickness]/10} inside the principal surface from the one of the side surfaces of the light guide plate or one of the pair of the side surfaces opposed to each other].

2. The liquid crystal display according to claim 1, wherein the whiteness of the light guide plate in an area adjacent to the light source satisfies the following relationship with respect to the LD, $$41-0.19\times LD+3.8\times 10^{-4}\times LD^2-2.6\times 10^{-7}\times LD^3 > [\text{whiteness}].$$

3. The liquid crystal display according to one of claims 1 and 2, wherein
[Light guide plate thickness] is within a range of 0.5 through 4 mm.

4. The liquid crystal display according to claim 3, wherein
[Light guide plate thickness] is within a range of 1.6 through 3.5 mm.

* * * * *